US012715766B2

(12) United States Patent
Schmid McGuinness et al.

(10) Patent No.: US 12,715,766 B2
(45) Date of Patent: Aug. 25, 2026

(54) PROCESS AND PLANT FOR PRODUCING PURE HYDROGEN BY STEAM REFORMING WITH LOW CARBON DIOXIDE EMISSIONS

(71) Applicant: L'Air Liquide, Société Anonyme pour l'Etude et l'Exploitation des Procédés Georges Claude, Paris (FR)

(72) Inventors: Teja Schmid McGuinness, Frankfurt am Main (DE); Sophia Schmidt, Frankfurt am Main (DE); Jakub Kuzniar, Cracow (PL)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 453 days.

(21) Appl. No.: 18/565,252

(22) PCT Filed: May 24, 2022

(86) PCT No.: PCT/EP2022/025240
§ 371 (c)(1),
(2) Date: Nov. 29, 2023

(87) PCT Pub. No.: WO2022/253460
PCT Pub. Date: Dec. 8, 2022

(65) Prior Publication Data

US 2024/0253986 A1 Aug. 1, 2024

(30) Foreign Application Priority Data

May 31, 2021 (EP) .................................... 21020287

(51) Int. Cl.
*C01B 3/384* (2026.01)
*C01B 3/48* (2006.01)
(Continued)

(52) U.S. Cl.
CPC ................ *C01B 3/384* (2013.01); *C01B 3/48* (2013.01); *C01B 3/506* (2013.01); *C01B 3/56* (2013.01);
(Continued)

(58) Field of Classification Search
CPC ........... C01B 3/384; C01B 3/48; C01B 3/506; C01B 3/56; C01B 2203/0233;
(Continued)

(56) References Cited

U.S. PATENT DOCUMENTS 8,496,908 B1 7/2013 Genkin et al.
8,888,873 B2 11/2014 Haik-Beraud et al.
(Continued)

FOREIGN PATENT DOCUMENTS

WO WO 2010 018550 8/2009

OTHER PUBLICATIONS

Collodi, G. et al., Hydrogen production via steam reforming with $CO_2$ capture, Chemical Engineering Transactions, vol. 19, 2010, 37-42.
(Continued)

*Primary Examiner* — Andrew J. Oyer
(74) *Attorney, Agent, or Firm* — Allen E. White; Elwood L. Haynes

(57) ABSTRACT

A process and a plant for producing pure hydrogen by steam reforming of a feed gas containing hydrocarbons, preferably natural gas or naphtha, with reduced carbon dioxide emissions are proposed. The reduction in carbon dioxide emissions is achieved in accordance with the invention in that carbon dioxide is separated both out of a PSA tail gas stream and out of the flue gas from the reformer furnace by means of suitable measures.

19 Claims, 3 Drawing Sheets

(51) Int. Cl.
*C01B 3/506* (2026.01)
*C01B 3/56* (2006.01)

(52) U.S. Cl.
CPC ................ *C01B 2203/0233* (2013.01); *C01B 2203/0288* (2013.01); *C01B 2203/0415* (2013.01); *C01B 2203/043* (2013.01); *C01B 2203/046* (2013.01); *C01B 2203/0475* (2013.01); *C01B 2203/0816* (2013.01); *C01B 2203/0827* (2013.01); *C01B 2203/0833* (2013.01); *C01B 2203/1241* (2013.01); *C01B 2203/127* (2013.01); *C01B 2203/142* (2013.01)

(58) Field of Classification Search
CPC .... C01B 2203/0288; C01B 2203/0415; C01B 2203/043; C01B 2203/046; C01B 2203/0475; C01B 2203/0816; C01B 2203/0827; C01B 2203/0833; C01B 2203/1241; C01B 2203/127; C01B 2203/142; B01D 53/047; B01D 2256/16; B01D 2257/504
See application file for complete search history.

(56) References Cited

U.S. PATENT DOCUMENTS 9,512,004 B2 * 12/2016 Lang .................... B01J 19/0006
2007/0232706 A1 10/2007 Shah et al.
2010/0037521 A1 2/2010 Vakil et al.
2012/0141368 A1 6/2012 Vakil et al.
2013/0156685 A1 * 6/2013 Vauk ......................... C01B 3/56 423/652
2019/0135626 A1 5/2019 Rafati et al.
2021/0300757 A1 * 9/2021 Tadiello ................. F25J 3/0233
2023/0365405 A1 * 11/2023 Ruggeri .................... C01B 3/38
2025/0145459 A1 * 5/2025 Feinstein ................ C01B 3/382

OTHER PUBLICATIONS

Gasification, C. Higman and M. van der Burgt, eds., Ch. 8.2.3, Adsorption systems, Gulf Professional Publishing, Burlington, MA (2003), 340-343.

Pichot, D. et al., Start-up of Port-Jérôme Cryocap plant: optimized cryogenic $CO_2$ capture from $H_2$ plants, Energy Procedia 114 (2017) 2682-2689.

Ullmann's Encyclopedia of Industrial Chemistry, H. Hiller et al., 2. Steam reforming of natural gas and other hydrocarbons, $6^{th}$ (1998) edition, 325.

Ying, J. et al., The activator mechanism of piperazine in aqueous methyldiethanolamine solutions, Energy Procedia 114 (2017) 2078-2087.

International Search Report and Written Opinion for corresponding PCT/EP2022/025240, Sep. 6, 2022.

Collodi et al., Techno-economic evaluation of SMR based stand-alone (merchant) hydrogen plant with CCS, IEAGHG Technical Report Feb. 2017, Feb. 2017, 286 pages.

* cited by examiner

PROCESS AND PLANT FOR PRODUCING PURE HYDROGEN BY STEAM REFORMING WITH LOW CARBON DIOXIDE EMISSIONS

CROSS REFERENCE TO RELATED APPLICATIONS

This application is a 371 of International Application No. PCT/EP2022/025240, filed May 24, 2022, which claims priority to European Patent Application No. 21020287.5, filed May 31, 2021, the entire contents of which are incorporated herein by reference.

BACKGROUND

Field of the Invention

The invention relates to a process and to a plant for producing pure hydrogen by steam reforming of a feed gas containing hydrocarbons, preferably natural gas or naphtha, with reduced carbon dioxide emissions. The invention also relates to use of such a plant and to a process for retrofitting an existing steam reforming plant for producing pure hydrogen by steam reforming for reduction of carbon dioxide emissions.

Prior Art

Hydrocarbons can be catalytically reacted with steam to give synthesis gas, i.e. mixtures of hydrogen ($H_2$) and carbon monoxide (CO). As is explained in Ullmann's Encyclopedia of Industrial Chemistry, Sixth Edition, 1998 Electronic Release, under "Gas Production", this method called steam reforming is the most commonly employed method for the production of synthesis gas, which can then be converted to further important commodity chemicals such as methanol or ammonia. While different hydrocarbons, such as naphtha, liquid gas or refinery gases, can be converted, it is steam reforming of methane-containing natural gas that dominates.

After pre-heating by heat exchangers or fired heaters to a temperature above about 500° C., for example up to 650° C., the hydrocarbon-steam mixture enters the reformer tubes of the steam reformer after final heating to about 800° C. to 950° C. and is converted therein into carbon monoxide and hydrogen over the reforming catalyst. Nickel-based reforming catalysts are in widespread use. While higher hydrocarbons are converted fully to carbon monoxide and hydrogen, partial conversion is typical in the case of methane. The composition of the product gas is determined by the reaction equilibrium; the product gas thus contains not only carbon monoxide and hydrogen but also carbon dioxide, unconverted methane and water vapour. For energy optimization or for feedstocks comprising higher hydrocarbons, what is called a prereformer for preliminary cracking of the feedstock can be used downstream of the pre-heater. The precracked feedstock is then heated to the desired reformer tube inlet temperature in a further heater.

The hot synthesis gas product gas is partially cooled in indirect heat exchange against process media to be heated in one or more heat exchangers after leaving the reformer furnace. The partially cooled synthesis gas product gas then undergoes further conditioning steps dependent on the type of desired product or downstream process. If the synthesis gas production is primarily directed to the generation of pure hydrogen, the hydrogen content in the synthesis gas generated is increased by the application of CO conversion, also referred to as water-gas shift reaction (WGS) or CO shift reaction, according to the following conversion equation:

$$CO + H_2O = CO_2 + H_2$$

With addition of steam, the CO accordingly reacts to give $CO_2$ and $H_2$. Due to the enthalpy of reaction of −41.2 kJ/mol, increasing temperature shifts the chemical equilibrium from the reaction products towards the reaction reactants. Depending on the reaction temperature employed, the reaction is referred to as high-temperature shift (HTS), medium-temperature shift (MTS) or low-temperature shift (LTS). Depending on the type of catalysts used, it is further possible to also perform the shift reaction with the raw, unpurified synthesis gas. This process is referred to as raw gas shift or else—owing to the acidic gas constituents, such as carbon dioxide—as sour gas shift. All these conversion processes afford a converted synthesis gas stream or crude hydrogen stream as product.

What is disadvantageous here is that the performance of the CO conversion affords, as a coproduct of hydrogen, carbon dioxide, which is not very reactive and therefore often undesirable. The further workup of the converted synthesis gas therefore often also comprises a process for removing the carbon dioxide, for example by means of physical or chemical absorption or gas scrubbing. Such processes are also referred to as carbon capture (CC) processes. A known and frequently employed process for carbon dioxide removal is the Rectisol process, which comprises a scrubbing of the crude synthesis gas with cryogenic methanol as absorbent and is likewise described in principle in the abovementioned literature. Other scrubbing processes employ other scrubbing or absorption media, for example N-methylpyrrolidone (NMP), secondary amines, for example diethanolamine, tertiary amines, for example methyldiethanolamine (MDEA), polyethylene glycol dialkyl ethers, for example polyethylene glycol dimethyl ether. The specific process conditions to be employed here, the selection of which is familiar to those skilled in the art, are referred to hereinafter as carbon dioxide removal conditions.

For production of pure hydrogen, the concluding step that follows is typically the treatment of the crude hydrogen stream in a hydrogen enrichment apparatus which is typically configured as a pressure swing adsorption (PSA) plant, the fundamental properties of which are set out in the book "Gasification", C. Higman and M. van der Burgt, Chapter 8.2.3 "Adsorption systems", Gulf Professional Publishing (2003). Pressure swing adsorption uses molecular sieves as adsorbents in a series of vessels operated in a staggered cyclic mode which switches between an adsorption phase and different phases of regeneration. It is possible to achieve a very high purity with about 50 ppm of argon and less than 10 ppm of other impurities.

The carbon dioxide removed can be recycled wholly or partly to the synthesis gas production, for example the steam reforming, in order to utilize it physically. US patent specification U.S. Pat. No. 8,888,873 B2 discloses, by way of example, a synthesis gas production and synthesis gas workup comprising the process stages of synthesis gas production—sour gas ($CO_2$) removal—drying and adsorption of disruptive components—low-temperature fractionation of the synthesis gas in a coldbox. This discloses that a $CO_2$-rich stream from the $CO_2$ removal stage and/or gas streams from the low-temperature fractionation which contain hydrogen, carbon monoxide and/or methane are recycled to the synthesis gas production stage using one or more compressors, thus allowing better physical utilization thereof.

However, the recycling of carbon dioxide is generally desirable only when carbon monoxide is one of the target products of the process. In a steam reforming process based particularly or exclusively on the generation of pure hydrogen, the carbon dioxide removed, by contrast, is either passed on to external consumers or released into the atmosphere. The latter measure is increasingly undesirable and will be increasingly strictly regulated in the future in order to reduce carbon dioxide emissions from industrial plants, since carbon dioxide accelerates global warming on account of the greenhouse effect.

In the steam reforming of hydrocarbons, a further carbon dioxide source is that of heating of the catalyst-filled reformer tubes by means of a multitude of burners, in which natural gas is burned together with carbon-containing recycled gases as heating gas, giving a carbon dioxide-containing flue gas.

The reduction in carbon dioxide emissions from steam reforming plants has already been a topic of discussion in the literature. For instance, the article "Hydrogen Production via Steam Reforming with $CO_2$ Capture", G. Collodi, Chemical Engineering Transaction vol. 19, 2010, pp. 37-42, discusses carbon dioxide separation from the synthesis gas (crude hydrogen) and also from the flue gas obtained in the heating of the reformer furnace, and various suitable methods are mentioned, for example amine scrubbing, utilization of physical absorbents such as methanol, or membrane separation.

One disadvantage of the separation of carbon or carbon dioxide from the synthesis gas is that this gas stream contains only 55% to 65% of the emissions, and so the separation rate cannot exceed about 60% if $CO_2$ is separated solely from the synthesis gas. While ultimately all $CO_2$ emissions end up in the reformer flue gas, numerous difficulties with the separation of carbon in the flue gas are mentioned. The low partial pressure of the $CO_2$, typically 0.2 bara, which results from the combination of low $CO_2$ concentration and the low pressure of the flue gas, makes it more difficult to separate the $CO_2$. The volume flow rate of the flue gas is considerable; large amounts of water are required to cool the flue gas before it is passed to the $CO_2$ separation plant, and the stream contains compounds that can lead to unwanted degradation of an amine scrubbing agent or to corrosion of the equipment. The energy demand for desorption of the $CO_2$ from the absorbent is likewise higher in the case of an amine scrubbing of the flue gas than in the case of an amine scrubbing of the synthesis gas. In general, the separation of carbon dioxide from the flue gas is less energy- and cost-efficient than the separation of carbon dioxide from the synthesis gas, which makes the attainment of a high carbon separation rate an environmental and economic challenge.

The cited article by Collodi has the disadvantage that no detailed steam reforming process that takes account of the circumstances explained is given.

PCT publication WO 2010/018550 A1 describes a novel design of the steam reforming unit, in which the majority of all the $CO_2$ emissions from the steam reforming plant are moved into the synthesis gas stream or crude hydrogen stream, while the $CO_2$ emissions from the flue gas from the reformer furnace are minimized. In this way, it is possible to separate about 85% of the total carbon dioxide emissions from the synthesis gas stream, for which amine scrubbing methodology is used. Since the separation of $CO_2$ from the high-pressure synthesis gas stream is said to be much easier and less costly than that from the low-pressure reformer furnace offgas stream, the process disclosed would result in a cost benefit.

However, in the process proposed, the hydrogen recovery efficiency of the PSA plant present is artificially reduced in order to use a portion of the hydrogen production as fuel, which reduces the amount of natural gas that is required as fuel and increases the proportion of carbon dioxide that can be separated out of the synthesis gas. This reduces hydrogen production, or the entire steam reforming unit has to be correspondingly enlarged in order to produce the same amount of hydrogen.

In the article "Start-up of Port-Jérôme CRYOCAP Plant: Optimized Cryogenic $CO_2$ Capture from $H_2$ Plants", Energy Procedia 114 (2017), pp. 2682-2689, D. Pichot et al. describe the separation of $CO_2$ from the PSA tail gas in a steam reforming plant for production of pure hydrogen by means of the CRYOCAP process. In this case, the predominant proportion of the PSA tail gas is compressed and condensed in a cryogenically operated $CO_2$ separation column. The pure carbon dioxide obtained here as bottom product can be stored or, after optional further compression, drying and purification, is released to external consumers, for example from the food industry. The top product stream from the $CO_2$ separation column is purified further by means of membrane separation to obtain a hydrogen-rich permeate stream, which is recycled to the PSA plant and hence likewise utilized for the production of pure hydrogen. The retentate stream from the membrane separation contains combustible constituents and is therefore recycled as heating gas to the burners of the reformer furnace. However, in a similar manner to the synthesis gas, it is also possible to separate out a maximum of not more than about 60% of the total $CO_2$ emissions from the PSA tail gas. Moreover, the process described, in spite of the advantages described, does not offer any solution for carbon dioxide separation from the reformer furnace flue gas. Thus, in spite of the discussion of various approaches for reduction of carbon dioxide emissions from steam reforming plants in the literature, it is clear that there is still a need for detailed technical teachings for separation of $CO_2$ in steam reforming plants with a high separation rate, which enable effective and efficient removal of carbon dioxide especially in the production of pure hydrogen without any associated major restriction in the production of the pure hydrogen.

It is therefore the object of the present invention to specify a process and a plant for producing pure hydrogen by steam reforming of hydrocarbons with reduced carbon dioxide emissions, which do not have the disadvantages of the prior art that have been mentioned.

A steam reforming process with reduced carbon dioxide emissions is understood to mean a corresponding process having lower total carbon dioxide emissions compared to a comparable process with the same production capacity of pure hydrogen. For the assessment of the carbon dioxide emissions, it is important here to consider both direct and indirect $CO_2$ emissions.

Direct $CO_2$ emissions from steam reforming processes are attributable to two sources:

(a) The formation of carbon dioxide as a result of the chemical reactions that proceed in the steam reforming, expressed as the overall conversion equation using the example of natural gas with methane as the main component:

$$CH_4 + 2H_2O = CO_2 + 4H_2$$

For every kg of hydrogen produced, 5.5 kg of carbon dioxide is formed in this way.

(b) Carbon dioxide emissions attributable to the generation of heat for the endothermic steam reforming, the amount of which depends upon factors including the amount of steam exported. For a steam reforming process having a low steam export of 0.2 kg of steam per $m_N^3$ of hydrogen generated, 3.5 kg of carbon dioxide per kg of hydrogen generated is obtained in this way; in the case of a higher steam export of 1.2 kg of steam per $m_N^3$ of hydrogen generated, 5.0 kg of carbon dioxide per kg of hydrogen generated is obtained.

Direct $CO_2$ emissions from steam reforming processes are accordingly calculated, for example, as 10.5 kg of carbon dioxide per kg of hydrogen generated.

Indirect $CO_2$ emissions from steam reforming processes are attributed essentially to the consumption of electrical energy and of steam within the steam reforming process. For example, for the regeneration of laden absorbents, considerable amounts of heating steam are consumed. This steam thus cannot be exported, and there is therefore no $CO_2$ credit that is otherwise obtained for this by-product. The generation of electrical energy and of steam outside the steam reforming process is likewise associated with $CO_2$ emissions, which are therefore considered as indirect $CO_2$ emissions.

The steam reforming conditions and CO conversion conditions are known to those skilled in the art from the prior art, for example the documents discussed at the outset. These are the physicochemical conditions under which a measurable, preferably industrially relevant, conversion of hydrocarbons to synthesis gas products (steam reforming) or of carbon monoxide and steam to carbon dioxide and hydrogen according to the conversion equation shown above is achieved. Necessary adjustments of these conditions to the particular operating requirements, for example with regard to the reactant volume flow rates, pressures, reaction temperatures, especially the steam reforming inlet temperature, nature and amount of catalysts used, will be undertaken on the basis of routine tests. Any specific reaction conditions disclosed may serve here as a guide, but they should not be regarded as limiting in relation to the scope of the invention.

A physical or chemical carbon dioxide separation process in the context of the present disclosure is understood to mean a process that enables separation of a fluid mixture, for example a gas mixture, into its constituents by employment of suitable physicochemical conditions, for example by phase conversion such as condensation or by use of a suitable sorbent, or removal of unwanted components from said mixture. If a sorption process is employed, this may be based on an adsorption, i.e. binding of the substance(s) to be removed to a surface or interface of the solid absorbent, or on an absorption, i.e. uptake of the substance(s) to be removed into the volume of the liquid or solid absorbent. The substance(s) removed and bound by sorption are referred to as adsorbate/absorbate. The binding forces acting here may be physical or chemical by nature. Accordingly, physical sorption results from usually relatively weak, less specific bonding forces, for example van der Waals forces, whereas chemical sorption results from relatively strong, more specific bonding forces, and the adsorbate/absorbate and/or the adsorbent/absorbent are chemically altered.

Synonyms used for the term "absorbent" in the context of this disclosure are the terms "absorbing agent" or "scrubbing agent" in the case of liquid absorbents.

One specific, physical absorption process is gas scrubbing with cryogenic methanol, which uses as absorbent or scrubbing medium methanol having a temperature cooled by means of refrigerating processes to below ambient temperature, preferably below 0° C., most preferably below −30° C. This process is known to those skilled in the art as the Rectisol process.

By contrast, the amine scrubbing operations that are known per se and are frequently used for absorption of carbon dioxide are based on chemical absorption (chemisorption) and attain high purities in the absorption column even at relatively low pressures. Selectivity is likewise usually higher than in physical absorption processes.

In amine scrubbing, slightly alkaline aqueous solutions of amines, frequently ethanolamine derivatives, are used in an absorption unit (absorption section) which is usually configured as a scrubbing column. Absorption is generally effected here at low temperature, for example 40° C., and slightly elevated pressure, for example 8 bara. Fresh or regenerated absorbent is applied here at the top of the column, and the gas stream to be separated is introduced in the lower region of the scrubbing column. In this case, carbon dioxide is reversibly chemically absorbed. The carbon dioxide-depleted gas leaves the column at the top, and the laden scrubbing agent is discharged at the bottom of the column and guided into a desorption section, which is likewise frequently configured as a separating column. In the desorption column (regeneration section), at higher temperature and lower pressure, the chemical equilibrium is reversed, and hence the carbon dioxide absorbed is released in gaseous form. It can then be discharged at the top of the desorption column and sent to a further utilization or disposal. The absorbent regenerated in this way is recycled to the absorption section.

An absorbent frequently used in amine scrubbing is methyldiethanolamine (MDEA), which is usually used in aqueous solutions. In addition, activators, for example piperazine, are frequently added in order to accelerate carbon dioxide absorption, as described, for example, in the article "The Activator Mechanism of Piperazine in Aqueous Methyldiethanolamine Solutions", J. Ying et al., Energy Procedia 114 (2017), pp. 2078-2087. These mixtures are then referred to as activated MDEA solutions (aMDEA).

A process for cryogenic carbon dioxide capture (CCC) in the context of the present disclosure is understood to mean a process in which carbon dioxide can be condensed by cooling and hence separated out of a gas. This is especially understood to mean a $CO_2$ removal process as described in the above-cited article by D. Pichot et al. In this case, the predominant proportion of the PSA tail gas is compressed and condensed in a cryogenically operated $CO_2$ separation column. The pure carbon dioxide obtained here as bottom product can be stored or, after optional further compression, drying and purification, is released to external consumers, for example from the food industry. The top product stream from the $CO_2$ separation column is purified further by means of membrane separation to obtain a hydrogen-rich permeate stream, which is recycled to the PSA plant and hence likewise utilized for the production of pure hydrogen. The retentate stream from the membrane separation contains combustible constituents and is therefore recycled as heating gas to the burners of the reformer furnace.

A fluid connection between two regions of the apparatus of the invention is understood to mean any type of connection which makes it possible for a fluid, for example a gas stream, to be able to flow from one to the other of the two regions, regardless of any regions or components located in between. In particular, a direct fluid connection is understood to mean any type of connection which makes it possible for a fluid, for example a gas stream, to flow directly from one to the other of the two regions, wherein no further regions or components are interposed, with the exception of purely transportational operations and the means required therefor, for example pipelines, valves, pumps, compressors, reservoirs. One example would be a pipe conduit leading directly from one to the other of the two regions.

A means is understood to mean an article which makes it possible to achieve, or is helpful in achieving, an objective. In particular, means of performing a particular process step are understood to mean all those physical articles which a person skilled in the art would consider in order to be able to perform this process step. For example, a person skilled in the art will consider means of introducing or discharging a stream to include all transporting and conveying apparatuses, i.e., for example, pipelines, pumps, compressors, valves, which seem necessary or sensible for the performance of that process step on the basis of their knowledge in the art.

All pressures are reported in absolute pressure units, bara or bar(a) for short, or in gauge pressure units, barg or bar(g) for short, unless stated otherwise in the particular individual context.

For the purposes of this description, steam is to be understood as being synonymous with water vapour unless stated otherwise in an individual case. The invention is based on the finding that it is advantageous to separate carbon dioxide both from a PSA tail gas stream and from the reformer furnace flue gas by means of suitable carbon dioxide separation processes. This configuration results in lower consumption of operating media, lower energy consumption, better energy efficiency, lower indirect emissions and higher carbon dioxide separation rates than, for example, steam reforming processes in which carbon dioxide alone is removed solely from the flue gas. In spite of the higher capital costs, this configuration is therefore viable. It additionally offers higher flexibility in terms of capital costs: For instance, the apparatus for carbon dioxide separation from a PSA tail gas stream may first be installed as the first carbon dioxide separation apparatus in order to utilize the advantages of a possible deep process integration in a new construction of a steam reforming plant, or if the cost of emitting carbon dioxide justifies the separation of carbon dioxide from the synthesis gas but the cost of emission is still too low to justify the capital costs involved in the second carbon dioxide separation apparatus for the flue gas.

A second aspect of the process according to the invention is characterized in that the feed gas stream is pretreated by means of one or more processes selected from the following group: desulfurization under desulfurization conditions, prereforming under prereforming conditions.

A third aspect of the process according to the invention is characterized in that the first coolant stream guided to the first heat recovery apparatus comprises one or more fluid streams selected from the following group:

water and/or aqueous condensate, to produce a first steam stream, boiler feed water, to produce a preheated boiler feed water stream, feed gas containing hydrocarbons, to produce a preheated feed gas stream.

In this way, it is possible to utilize the enthalpy content of the crude synthesis gas stream in order to raise steam, to preheat boiler feed water or to provide a preheated feed gas stream, or to conduct two or more of these measures. In this way, the energy efficiency of the process is further improved. A fourth aspect of the process according to the invention is characterized in that the second coolant stream guided to the second heat recovery apparatus comprises one or more fluid streams selected from the following group:

water and/or aqueous condensate, to produce a second steam stream, boiler feed water, to produce a preheated boiler feed water stream, feed gas containing hydrocarbons, to produce a preheated feed gas stream, PSA tail gas stream, to produce a preheated PSA tail gas stream, CCC tail gas stream, to produce a preheated CCC tail gas stream, a carbon dioxide-laden absorbent stream.

In this way, it is possible to utilize the enthalpy content of the converted synthesis gas stream in order to raise steam, to preheat boiler feed water, to provide a preheated feed gas stream, to provide a preheated PSA tail gas stream, to provide a preheated CCC tail gas stream, or to conduct two or more of these measures. Alternatively or additionally, the enthalpy content of the converted synthesis gas stream may be utilized in order to preheat a carbon dioxide-laden absorbent stream and hence to promote the regeneration of the absorbent. These measures further improve the energy efficiency of the process.

A fifth aspect of the process according to the invention is characterized in that the CO conversion plant and the second heat recovery apparatus coincide in terms of construction and/or functionality. This can be effected, for example, in such a way that the converted synthesis gas stream, before it exits from the CO conversion plant, can be cooled by indirect heat exchange with heat exchangers integrated into the CO conversion plant that are provided for this purpose with sufficient effectiveness that it is possible to dispense with a separate second heat recovery apparatus. Coolant streams used may especially be the fluid streams discussed with the fourth aspect of the invention. This saves installation space, minimizes energy losses in the conduits, and dispenses with the second heat recovery apparatus as a separate piece of equipment. These measures further improve the energy efficiency of the process.

A sixth aspect of the process according to the invention is characterized in that the CO conversion plant is configured as a cooled reactor, and the second coolant stream or one or more of the fluid streams that it comprises is/are used for reactor cooling. What is particularly envisaged in this configuration is that there is no cooling, or not only cooling, of the converted synthesis gas stream before it exits from the CO conversion plant, but rather cooling of the reaction zone itself, for example the catalyst bed of the CO conversion plant, such that, in the ideal case, an isothermal reactor or a reactor type approximating thereto is implemented. What is advantageous here is the possibility of an optimized temperature regime in the reactor section of the CO conversion plant, which further increases the conversion achieved to the hydrogen target product. Moreover, these measures further improve the energy efficiency of the process in that the advantages obtained in association with the fifth aspect of the invention are likewise achieved.

A seventh aspect of the process according to the invention is characterized in that the CO conversion plant comprises:

(a) a two-stage configuration with a high-temperature CO conversion stage (HTS) and a low-temperature CO conversion stage (LTS), between which is disposed a heat recovery apparatus, or (b) a one-stage configuration with a medium-temperature CO conversion stage (MTS).

In configuration (a), the heat recovery apparatus disposed between the high-temperature CO conversion stage (HTS) and a low-temperature CO conversion stage (LTS) may be a third, additional heat recovery apparatus, or it is possible to use the first or the second or both heat recovery apparatus (es). In one example, the crude synthesis gas, after exiting from the HTS stage, is cooled down to a temperature in the range from 180° C. to 220° C., before it is guided into an isothermal or cooled low-temperature shift (LTS) or medium-temperature shift (MTS) reactor which is designed as a heat exchange reactor in which the exothermic water-gas shift reaction (CO conversion) takes place and the converted synthesis gas is simultaneously cooled by a stream at suitable temperature, for example a hydrocarbon feed gas stream, boiler feed water, PSA tail gas, or a combination of such streams. The cooled converted synthesis gas then exits from the CO conversion plant at a temperature low enough to guide it directly as heating medium into the boiler of the regeneration section of the first and/or second carbon dioxide separation apparatus(es), which are configured as an amine scrub in one example. In one example, upstream of the inlet of the heating medium into the boiler of the regeneration section, it is additionally possible to provide a quench cooler in order to control the temperature at the boiler inlet such that the heating medium temperature does not exceed a particular threshold in order to prevent thermal breakdown of the amine solution used as absorbent.

In a one-stage configuration according to the seventh aspect of the invention with a medium-temperature CO conversion stage (MTS) according to (b), it is less easy to approach the optimal reaction temperatures, but there are advantages with regard to the lower apparatus complexity and lower space demand compared to the configuration according to (a).

An eighth aspect of the process according to the invention is characterized in that the molar proportion of carbon monoxide in the PSA tail gas is between 0 and 10 mol %. Especially in the case of configurations including a low-pressure CO conversion stage (LTS) and/or a medium-temperature CO conversion stage (MTS), it is possible to achieve such small molar proportions of carbon monoxide in the PSA tail gas. In this way, the yield of pure hydrogen is increased further. In that case, the calorific value of the portion of the CCC tail gas stream fed to the reformer furnace is attributable particularly to the content of hydrocarbons and residual hydrogen.

A ninth aspect of the process according to the invention is characterized in that the apparatus for cryogenic carbon dioxide capture comprises:

at least one compression stage for compression of the PSA tail gas, at least one membrane separation stage and/or adsorption stage for removal of the hydrogen-enriched stream, a stripping column in which carbon dioxide is obtained as the purified bottom product.

In this configuration, the predominant proportion of the PSA tail gas is compressed and condensed in a cryogenically operated $CO_2$ separation column. The pure carbon dioxide obtained here as bottom product can be stored or, after optional further compression, drying and purification, is released to external consumers, for example from the food industry. The top product stream from the $CO_2$ separation column is purified further by means of membrane separation to obtain a hydrogen-rich permeate stream, which is recycled to the PSA plant and hence likewise utilized for the production of pure hydrogen. The retentate stream from the membrane separation contains combustible constituents and is therefore recycled as heating gas to the burners of the reformer furnace.

A tenth aspect of the process according to the invention is characterized in that the column for cryogenic distillation of carbon dioxide comprises a column bottom that is heated by means of a boiler, wherein the heat source used in the boiler is neither heating steam nor a fluid stream which is supplied from the outside to the apparatus for cryogenic carbon dioxide capture. In this way, the energy balance of the process and of the plant according to the invention is further improved, and the independence from any operating media supplied from outside is increased further.

An eleventh aspect of the process according to the invention is characterized in that the second carbon dioxide separation apparatus works by at least one carbon dioxide separation process selected from the following group:

(a) absorption with a carbon dioxide-selective chemical absorbent, (b) adsorption with a carbon dioxide-selective adsorbent, (c) membrane separation with a carbon dioxide-selective membrane, (d) cryogenic carbon dioxide capture.

The steam reforming flue gas that enters the second carbon dioxide separation apparatus has a comparatively low partial carbon dioxide pressure at this point in the process, for example by comparison with the partial carbon dioxide pressure in the converted synthesis gas stream. Therefore, chemisorptive methods of carbon dioxide separation are of better suitability here than physisorptive methods, since the latter work better at high partial carbon dioxide pressures. By contrast, methods of good suitability for carbon dioxide removal at low partial carbon dioxide pressures include, in particular, adsorption and cryogenic carbon dioxide capture, the latter being understood to mean a process as described in the above-discussed article by D. Pichot et al. Especially in a configuration according to (d), synergistic effects arise here, since the cryogenic carbon dioxide capture that exists in any case according to the invention can also be utilized in full or in parts.

A twelfth aspect of the process according to the invention is characterized in that the first carbon dioxide separation apparatus is configured and operated such that at least 40%, preferably at least 50%, of the direct carbon dioxide emissions from the overall process are separated therein, and in that the second carbon dioxide separation apparatus is configured and operated such that the overall degree of separation of the direct carbon dioxide emissions from the overall process is at least 89%. This achieves the same high separation rate as in the prior art process in which the $CO_2$ emissions are separated only from the flue gas, while the consumption of energy and operating media is distinctly reduced.

A thirteenth aspect of the process according to the invention is characterized in that the second carbon dioxide separation apparatus is configured and operated such that the sum total of the vapour streams generated in the overall process is greater than the volume streams of the heating steam consumed for regeneration of the carbon dioxide separation apparatuses. In this way, it is possible to use the internal steam generated in the process for regeneration of the carbon dioxide separation apparatuses, nevertheless leaving a portion of the steams of stream generated for export.

A fourteenth aspect of the process according to the invention is characterized in that the specific steam consumption for regeneration of the carbon dioxide separation apparatuses per kg of carbon dioxide separated is less than 1.0 kg. Studies have shown that it is possible to limit the specific steam consumption for regeneration of the carbon dioxide separation apparatuses to this range of values, nevertheless obtaining sufficient regeneration performance of the carbon dioxide separation apparatuses, for example in relation to the regeneration of the scrubbing agents, if a physical or chemical absorption is being used. The energy efficiency of the overall process with carbon dioxide separation is likewise improved, which is shown by the lower indirect total emissions compared to the energy consumption in the form of electrical energy or heat/steam.

A fifteenth aspect of the process according to the invention is characterized in that the first and second carbon dioxide-rich streams are sent to at least one common workup stage selected from the following group:

- common carbon dioxide dryer,
- common carbon dioxide compressor,
- common carbon dioxide liquefaction apparatus.

In this way, the workup stages and the apparatuses present therein are used collectively, which gives synergistic effects. Moreover, homogenization of the carbon dioxide product stream released by the respective workup stage is enabled, especially within the scope of startup, shutdown or load change processes in the plant.

A sixteenth aspect of the process according to the invention is characterized in that the process is operated in two operating periods at different times, wherein only the first carbon dioxide separation apparatus is operated in the first operating period, and the first carbon dioxide separation apparatus and the second carbon dioxide separation apparatus are operated in the second operating period. What is advantageous here is that, in the first operating period, it is possible to operate only the first carbon dioxide separation apparatus when the carbon dioxide emission cost justifies the separation of carbon dioxide from the synthesis gas, but the emission cost is still too low to also justify the operation of the second carbon dioxide separation apparatus for the flue gas. This increases the technical and economic flexibility of the process.

In an eighteenth aspect of the invention, the plant is configured such that the apparatus for cryogenic carbon dioxide capture comprises:

- at least one compression stage for compression of the PSA tail gas,
- at least one membrane separation stage and/or adsorption stage for removal of the hydrogen-enriched stream,
- a stripping column in which carbon dioxide is obtained as the purified bottom product, wherein the plant further comprises:

- a second carbon dioxide separation apparatus which is operable as a continuous amine scrub and comprises an absorption section and a regeneration section.

Studies have shown that it is possible in this way to further improve the energy balance of the process or of the plant according to the invention, and at the same time to obtain hydrogen and carbon dioxide product streams of high purity.

A nineteenth aspect of the invention relates to a process for retrofitting an existing plant for production of pure hydrogen by steam reforming for reduction of carbon dioxide emissions, characterized in that the retrofitting is effected in two development stages at different times, wherein only the first carbon dioxide separation apparatus is installed in the first development stage and the second carbon dioxide separation apparatus is additionally installed in the second development stage. For instance, the apparatus for carbon dioxide separation from the cooled converted synthesis gas stream may first be installed in order to utilize the advantages of a possible deep process integration in a new construction of a steam reforming plant, or if the cost of emitting carbon dioxide justifies the separation of carbon dioxide from the synthesis gas but the cost of emission is still too low to justify the capital costs involved in the second carbon dioxide separation apparatus for the flue gas. This increases the technical and economic flexibility of the plant and the use thereof.

A twentieth aspect of the invention relates to the use of a plant according to the first or eighteenth aspect of the invention for producing pure hydrogen by steam reforming with reduced carbon dioxide emissions.

BRIEF DESCRIPTION OF THE DRAWINGS

Further developments, advantages and possible uses of the invention are also apparent from the description of working examples that follows and the drawings. The invention is formed by all of the features described and/or depicted, either on their own or in any combination, irrespective of the way they are combined in the claims or the dependency references therein.

The figures show.

DETAILED DESCRIPTION OF PREFERRED EMBODIMENTS

Figure 1:
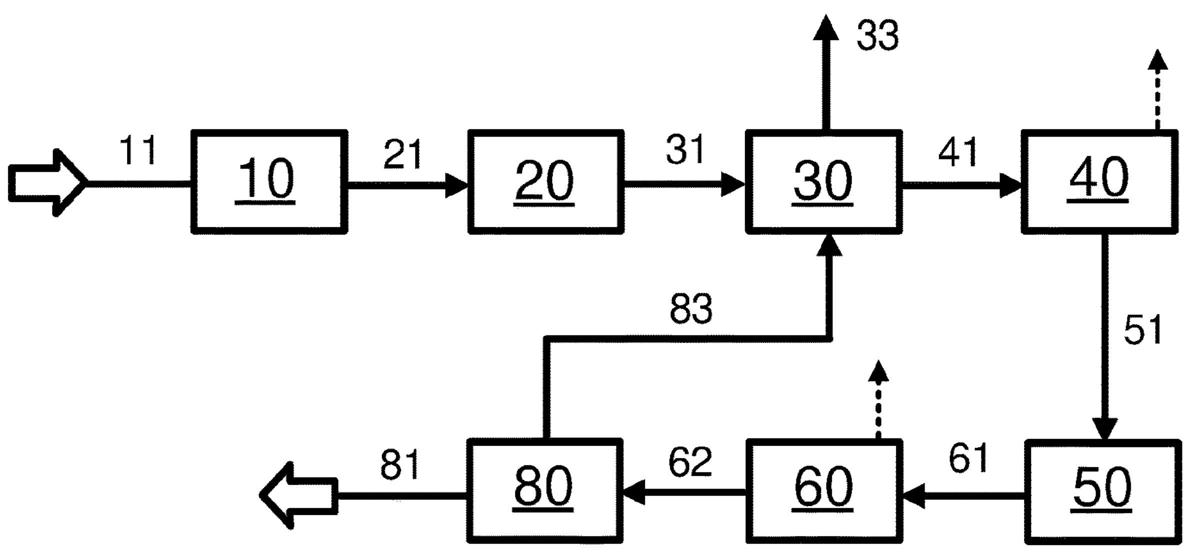
FIG. 1 is a first example of a steam reforming process or a corresponding plant according to the prior art for producing pure hydrogen without carbon dioxide removal.

A hydrocarbon feed gas stream introduced via conduit 11 into the process or plant, preferably methane-rich natural gas, is first treated in a hydrodesulfurization reactor (HDS) 10 in order to remove sulfur and sulfur compounds that would otherwise poison the downstream catalysts. The desulfurized feed gas stream is discharged via conduit 21, mixed with steam and guided into a pre-reforming reactor (prereformer) 20, where higher hydrocarbons are converted to $C_1$ compounds, in order to avoid the high-temperature cracking of these higher hydrocarbons in later steps of the process.

The pre-reformed hydrocarbon feed gas stream is discharged via conduit 31, mixed with steam in a superstoichiometric amount and introduced into a steam reforming reactor (main reforming stage) 30, comprising catalyst-filled reformer tubes and a reformer furnace. The steam-methane reforming reaction proceeds strongly endothermically; therefore, the heat for the reaction is provided by the combustion of one or more fuel gases with air in the furnace. In this case, a portion of the hydrocarbon feed gas stream can serve as a fuel gas; further fuel gases may be obtained from combustible recycling streams that are obtained within the process. The heat generated in the burners of the reformer furnace is then transferred by radiation to the catalyst-filled reformer tubes, where the pre-reformed hydrocarbon feed gas stream is converted with steam at high temperature to a crude synthesis gas stream consisting mainly of hydrogen, carbon monoxide and carbon dioxide and steam, and still containing fractions of unconverted hydrocarbons. This crude synthesis gas stream is then discharged via conduit 41 from the steam reforming reactor 30, fed to a first heat recovery apparatus 40 and cooled therein, generating a first steam stream, which is indicated by a dotted arrow.

The cooled crude synthesis gas stream is discharged via conduit 51 from the first heat recovery apparatus 40 and fed to a CO conversion plant 50 comprising one or more CO conversion stages, each of which may comprise one or more separate reactors (water-gas shift reactors) or catalyst beds. In the CO conversion plant, remaining carbon monoxide is converted by reaction with steam to additional hydrogen, forming carbon dioxide as coproduct. Since the CO conversion proceeds exothermically, the converted synthesis gas stream is then discharged via conduit 61 from the CO conversion plant 50 and fed to a second heat recovery apparatus 60 and cooled therein, generating a second steam stream, which is indicated by a dotted arrow.

The cooled converted synthesis gas stream is discharged from the second heat recovery apparatus 60 via conduit 62 and fed to a hydrogen enrichment apparatus 80 configured as a pressure swing adsorption plant (PSA plant) in which a pure hydrogen product stream is obtained and is discharged as target product via conduit 81. Also obtained is at least one PSA tail gas stream, containing carbon monoxide, carbon dioxide, unconverted methane and hydrogen. It is discharged from the PSA plant via conduit 83 and fed as further fuel gas stream to the burners of the reformer furnace.

The combustion of the fuel gas stream(s) with combustion air in the reformer furnace generates a flue gas stream which is discharged via conduit 33 and, for example, released to the environment. A disadvantage here is that the flue gas stream contains the entire carbon dioxide emissions from the process, which are thus released unabated into the environment. This is problematic against the background of ever stricter emission regulations for greenhouse gases such as carbon dioxide. A further disadvantage here is that the partial pressure of carbon dioxide in the steam reforming flue gas is low; but since the flue gas stream is comparatively large, the amount of carbon dioxide emitted is nevertheless considerable.

Figure 2:
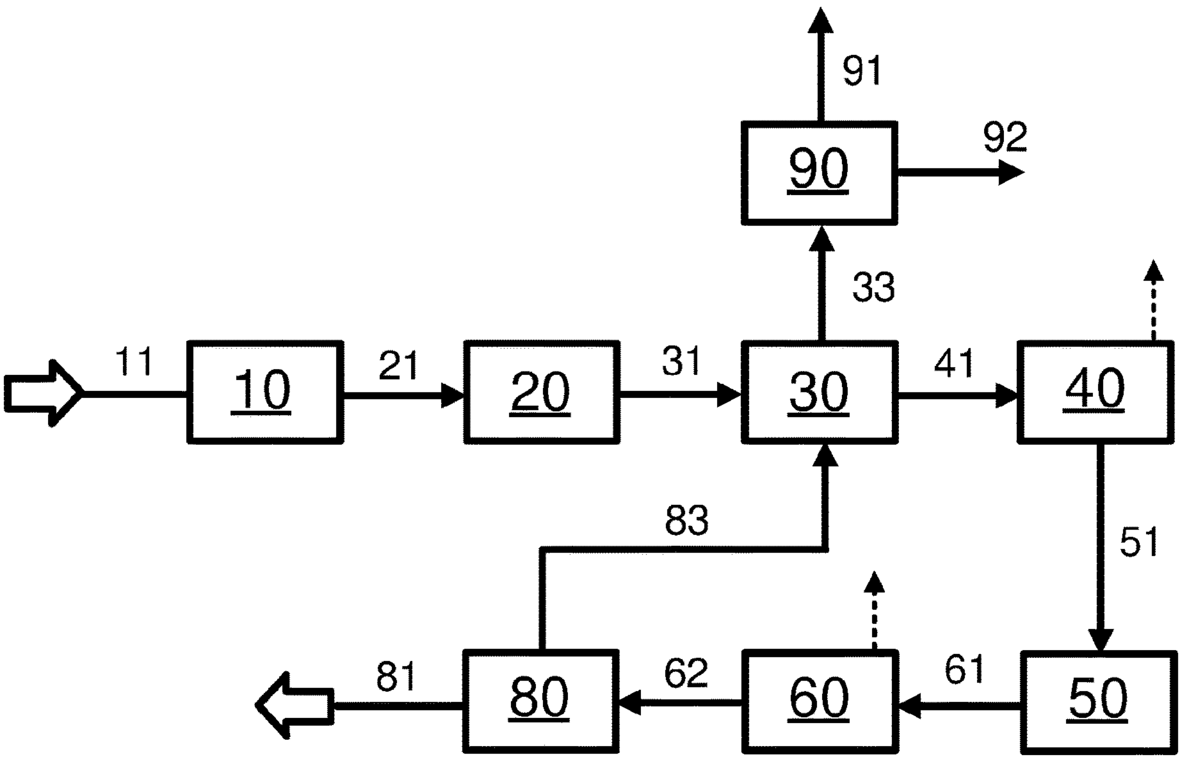
FIG. 2 is a second example of a steam reforming process or a corresponding plant according to the prior art for producing pure hydrogen by means of steam reforming and with carbon dioxide removal from the reformer furnace flue gas.

FIG. 2 therefore shows a second example of a steam reforming process or a corresponding plant according to the prior art for producing pure hydrogen by means of steam reforming and with carbon dioxide removal from the reformer furnace flue gas. The constituents of the process and of the plant and the function and properties thereof correspond to those of FIG. 1 with the same reference numerals.

Compared to FIG. 1, FIG. 2 has an additional carbon dioxide separation apparatus 90 that serves to separate carbon dioxide from the flue gas and which is fed with the steam reforming flue gas stream via conduit 33. The carbon dioxide separation is effected here, for example, by means of one or more of the carbon dioxide separation methods specified below:

(a) absorption with a carbon dioxide-selective chemical absorbent, (b) adsorption with a carbon dioxide-selective adsorbent, (c) membrane separation with a carbon dioxide-selective membrane, (d) cryogenic carbon dioxide capture.

The steam reforming flue gas that enters the second carbon dioxide separation apparatus has a comparatively low partial carbon dioxide pressure at this point in the process, for example by comparison with the partial carbon dioxide pressure in the converted synthesis gas stream. This makes it more difficult to separate the carbon dioxide, and large flue gas streams have to be treated. Therefore, chemisorptive methods of carbon dioxide separation are of better suitability here than physisorptive methods, since the latter work better at high partial carbon dioxide pressures. By contrast, methods of good suitability for carbon dioxide removal at low partial carbon dioxide pressures include, in particular, adsorption and cryogenic carbon dioxide capture, the latter being understood to mean a process as described in the above-discussed article by D. Pichot et al.

In FIG. 2, a carbon dioxide-depleted flue gas stream is discharged from the carbon dioxide separation apparatus 90 via conduit 91. In addition, a carbon dioxide-rich stream is discharged via conduit 92, which is then fed to storage, workup or further processing (not shown in the figure).

There are numerous disadvantages in the separation of carbon dioxide from the steam reforming flue gas. The low partial pressure of the carbon dioxide which results from the combination of low carbon dioxide concentration and low pressure of the flue gas makes it more difficult to separate the carbon dioxide. The volume flow rate of the flue gas is considerable, and large amounts of water are required to cool the flue gas before it is passed to the carbon dioxide separation plant, and the flue gas stream may also contain acidic compounds, for example sulfur dioxide or nitrogen oxides, that can lead to degradation of an amine-based absorbent or to corrosion of the plant. The energy demand for desorption of the carbon dioxide from the laden absorbent, for example in a configuration as amine scrub for the flue gas, is likewise higher than in the case of an amine scrub for separation of carbon dioxide from the synthesis gas. In general, an amine scrub for separation of carbon dioxide from the flue gas is less energy- and cost-efficient than a plant for separation of carbon dioxide from the synthesis gas. Considering the indirect emissions that are associated with the consumption of steam or power, it becomes clear that a less energy-efficient solution for carbon dioxide separation also leads to higher indirect emissions.

Figure 3:
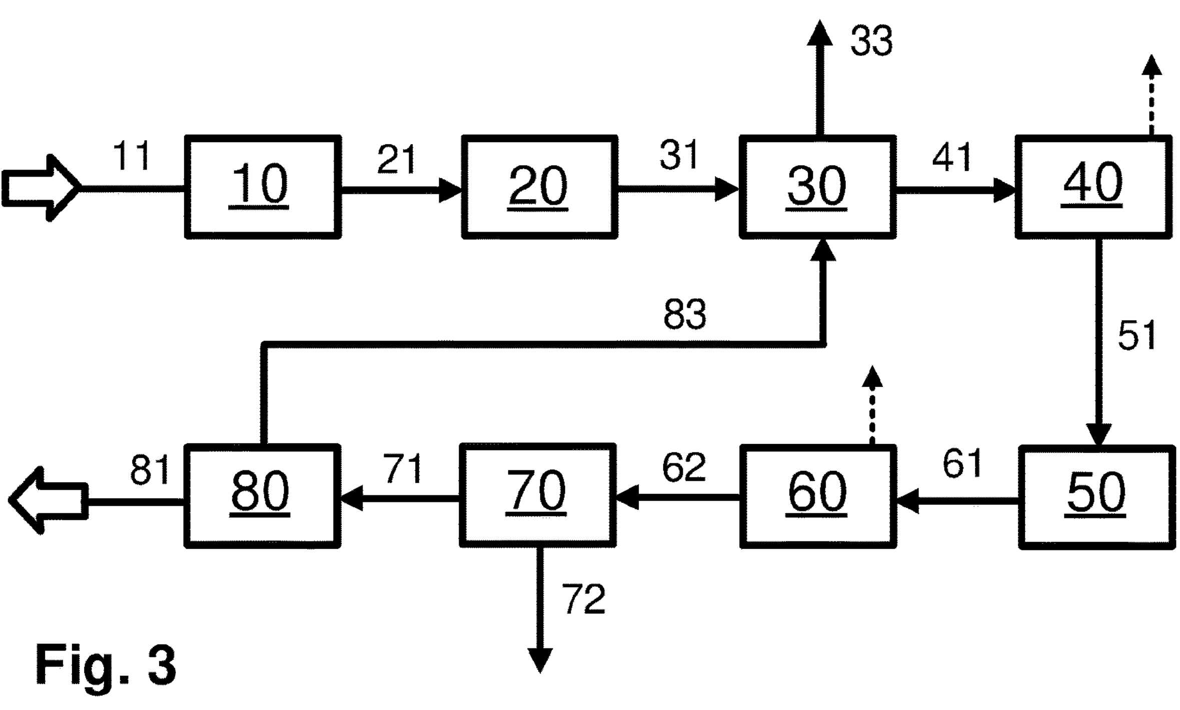
FIG. 3 is a third example of a steam reforming process or a corresponding plant according to the prior art for producing pure hydrogen by means of steam reforming and with carbon dioxide removal from the crude synthesis gas.

FIG. 3 shows a third example of a steam reforming process or a corresponding plant according to the prior art for producing pure hydrogen by means of steam reforming and with carbon dioxide removal from the crude synthesis gas. The constituents of the process and of the plant and the function and properties thereof correspond to those of FIGS. 1 and 2 with the same reference numerals.

Compared to FIG. 1, FIG. 3 has an additional carbon dioxide separation apparatus 70 that serves to separate carbon dioxide from the cooled converted synthesis gas stream, which is supplied via conduit 62 and fed into it. The separation of carbon dioxide from the cooled converted synthesis gas stream is effected here, for example, by means of one or more of the carbon dioxide separation methods specified below:

(a) absorption with a carbon dioxide-selective physical or chemical absorbent,
(b) adsorption with a carbon dioxide-selective adsorbent,
(c) membrane separation with a carbon dioxide-selective membrane.

The carbon dioxide separation methods mentioned are known per se to the person skilled in the art, who will select a suitable method on the basis of the existing boundary conditions. For example, adsorption with a carbon dioxide-selective absorbent is suitable particularly when the carbon dioxide concentration is already very low, for example in the trace region. Absorption methods and membrane separation methods are more suitable for greater concentrations or partial pressures of carbon dioxide. Absorption methods are employable in a particularly favourable manner when the carbon dioxide absorption proceeds rapidly, the absorption capacity of the scrubbing agent is high, the scrubbing agent used is highly selective for carbon dioxide, and the desorption of the carbon dioxide for regeneration of the scrubbing agent is likewise readily possible. This is the case, for example, for chemisorptive amine-based scrubbing agents, for example based on aMDEA.

The disadvantage of carbon dioxide separation solely from the synthesis gas is that these streams contribute only 55% to 65% of the direct $CO_2$ emissions, and that the separation rate with these units alone therefore cannot exceed about 60%. Moreover, the separation of carbon dioxide from the synthesis gas also has the effect that enthalpy is removed from the steam reforming plant, and the supply of heat to the reformer furnace is reduced, with the result that steam production is reduced.

Figure 4:
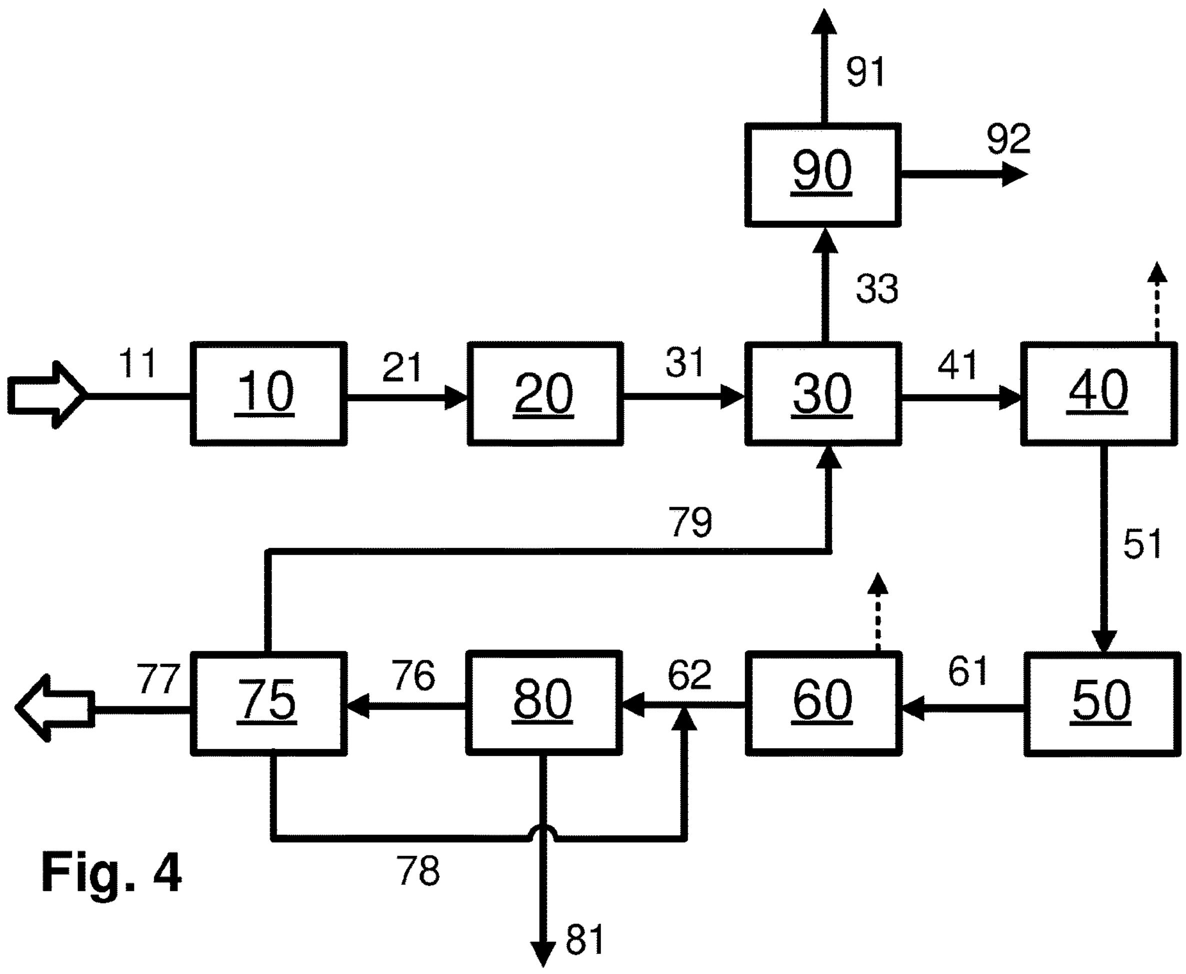
FIG. 4 is an example of a steam reforming process or a corresponding plant according to the invention for producing pure hydrogen by means of steam reforming and with carbon dioxide removal from the PSA tail gas and the reformer furnace flue gas.

FIG. 4 shows an example of a steam reforming process or a corresponding plant according to the invention for producing pure hydrogen by means of steam reforming and with carbon dioxide removal from the PSA tail gas and the reformer furnace flue gas. The constituents of the process and of the plant and the function and properties thereof correspond to those of FIGS. 1 to 3 with the same reference numerals.

Compared to FIG. 1, FIG. 4 has an additional carbon dioxide separation apparatus 90 (second carbon dioxide separation apparatus) that serves to separate carbon dioxide from the flue gas and which is fed with the steam reforming flue gas stream via conduit 33. The carbon dioxide separation is effected here, for example, by means of one or more of the carbon dioxide separation methods specified below:

(a) absorption with a carbon dioxide-selective chemical absorbent,
(b) adsorption with a carbon dioxide-selective adsorbent,
(c) membrane separation with a carbon dioxide-selective membrane,
(d) cryogenic carbon dioxide capture.

The steam reforming flue gas that enters the second carbon dioxide separation apparatus has a comparatively low partial carbon dioxide pressure at this point in the process, for example by comparison with the partial carbon dioxide pressure in the converted synthesis gas stream. This makes it more difficult to separate the carbon dioxide, and large flue gas streams have to be treated. Therefore, chemisorptive methods of carbon dioxide separation are of better suitability here than physisorptive methods, since the latter work better at high partial carbon dioxide pressures. By contrast, methods of good suitability for carbon dioxide removal at low partial carbon dioxide pressures include, in particular, adsorption and cryogenic carbon dioxide capture, the latter being understood to mean a process as described in the above-discussed article by D. Pichot et al.

Figure 5:
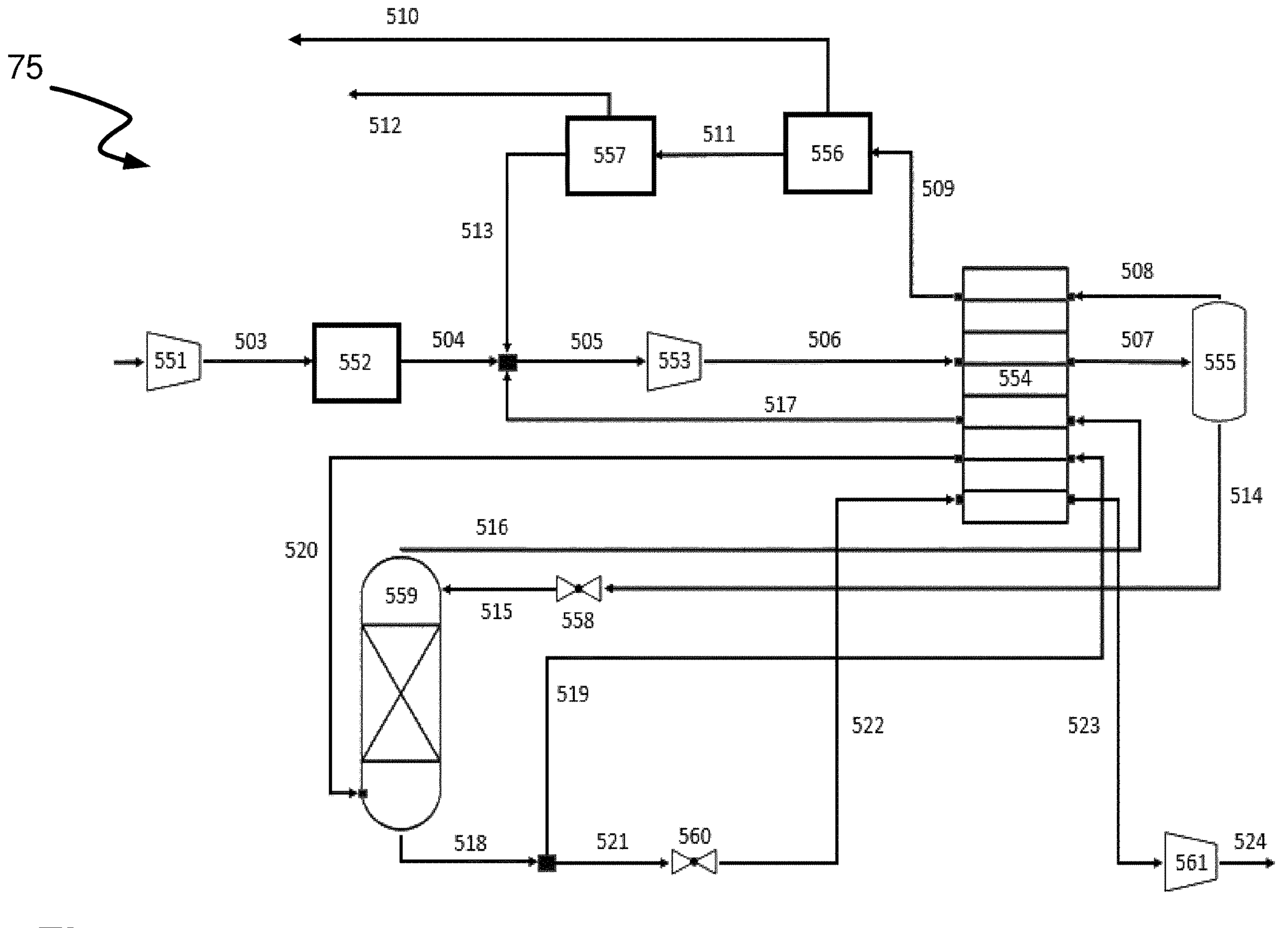
FIG. 5 is an example of a detailed configuration of the first carbon dioxide separation apparatus as cryogenic carbon dioxide capture in association with the configuration of the invention shown in FIG. 4.

Compared to FIG. 1, FIG. 4 also has an additional carbon dioxide separation apparatus 75 (first carbon dioxide separation apparatus) that serves to separate carbon dioxide from the PSA tail gas stream, which is supplied via conduit 76 and fed into it. In the example shown, carbon dioxide is separated from the PSA tail gas stream by means of a cryogenic carbon dioxide capture, the detailed configuration of which is shown by FIG. 5. Via conduit 81, the pure hydrogen product stream obtained in the hydrogen enrichment apparatus 80 is discharged as target product. The PSA tail gas stream likewise obtained here is discharged via conduit 76 and fed to the carbon dioxide separation apparatus 75, which is configured as a cryogenic carbon dioxide capture. A first carbon dioxide-rich stream is obtained therein and discharged via conduit 77. Also obtained is a CCC tail gas stream, which is discharged via conduit 79 and fed as fuel gas to the burners of the reformer furnace. Also obtained is a hydrogen-enriched stream, which is recycled via conduits 78 and 62 to the hydrogen enrichment apparatus 80.

FIG. 5 shows an example of a detailed configuration of the first carbon dioxide separation apparatus 75 as cryogenic carbon dioxide capture in association with the configuration of the invention shown in FIG. 4. In the configuration shown, a PSA tail gas stream discharged via conduit 76 from the hydrogen enrichment apparatus 80 (FIG. 4) is compressed in a multistage compressor 551 to a pressure of, for example, 10 to 20 bara, 11 bara in one example, and then dried in an adsorption unit 552.

The dried compressed PSA tail gas stream is fed via conduits 504 and 505 to a compressor 553, where it is compressed further to a pressure of, for example, 30 to 70 bara, 50 bara in one example. Via conduit 506, the further-compressed PSA tail gas stream is fed to a multi-fluid heat exchanger 554, in which it is cooled to a temperature below ambient temperature in indirect heat exchange with one or more cooling media.

The cooled PSA tail gas stream is fed via conduit 507 to a condensate separator 555. The cooled PSA tail gas stream that has been freed of condensate is discharged therefrom via conduit 508, used as cooling medium in heat exchanger 554, and then fed via conduit 509 to a first membrane separation stage 556. In the first membrane separation stage 556, a hydrogen-rich first permeate is separated from the PSA tail gas stream and is discharged via conduit 510 and recycled to the hydrogen enrichment apparatus 80, which increases the pure hydrogen yield of the process or plant. The first retentate obtained in the first membrane separation stage is fed via conduit 511 to a second membrane separation stage 557. In the second membrane separation stage 557, a hydrogen- and carbon dioxide-rich second permeate is separated from the first retentate and is discharged via conduit 513 and guided via conduits 505 and 506 after compression in the compressor 553 to the heat exchanger 554, where it is cooled further. Additionally obtained in the second membrane separation stage 557 is a second retentate which is rich in carbon monoxide and hydrocarbons, for example methane, which is guided as CCC tail gas stream via conduit 512 as fuel gas to the burners of the reformer furnace.

The liquid condensate obtained in the condensate separator 555 is guided via conduit 514, valve 558 and conduit 515 to a stripper column 559 in which liquid, purified carbon dioxide is obtained as the bottom product, and discharged from the process or plant as pure carbon dioxide product via conduit 518, conduit 521, valve 560, conduit 522, conduit 523, optional compressor 561 and conduit 524, after it has been used as a further cooling medium in the multi-fluid heat exchanger 554. A substream of the bottom product from the stripper column 559 is fed via conduit 519 as further cooling medium to the multi-fluid heat exchanger 554. This heats this substream, which is recycled via conduit 520 to the stripper column 559, into which it is introduced at the lower end. Thus, the multi-fluid heat exchanger 554 effectively serves as a boiler or reboiler for the stripper column 559.

Particularly advantageous configurations of the process or of the plant according to the invention are "integrated" configurations that are not shown pictorially, in which the second carbon dioxide separation apparatus works by a physical or chemical absorption method or an adsorption method or combinations of these methods and is used for thermal regeneration of the laden absorbents or adsorbents used for one or more hot process streams, for example a part of the hot synthesis gas stream or a part of the hot flue gas stream, preferably a part of the hot synthesis gas stream. In this way, it is possible to dispense with at least some of the heating steam typically used for thermal regeneration, such that the energy efficiency of the process or of the plant is further improved, and the ratio of steam produced to steam consumed is also improved. For example, the regeneration section of a first carbon dioxide separation apparatus that works on the basis of chemisorption with aMDEA-containing scrubbing agents can be heated with at least a portion of the hot converted synthesis gas stream, which is itself cooled thereby. For this purpose, the at least one portion of the hot converted synthesis gas stream can be utilized for example as a heat source in the boiler of a desorption column in the regeneration section of the second carbon dioxide separation apparatus.

Further cooling of the converted synthesis gas stream can be effected, for example, by indirect heat exchange with cold process media, for example the carbon dioxide feed gas stream. In this way, moreover, it is possible to preheat and/or evaporate fresh water, for example demineralized water, or process condensate obtained in the process, in order to assist the raising of steam. This makes it possible to dispense with technically complex cooling apparatuses, for example air coolers, or to use these with a smaller configuration. The energy efficiency of the overall process is thus improved further.

A further or alternative heat source that can be used for preheating of cold process media and/or for raising of steam from fresh water and/or process condensate may also be the enthalpy content of the hot steam reforming flue gas. In addition, it is possible to use either a hot process stream, for example the converted synthesis gas stream, or the hot steam reforming flue gas stream for thermal degassing of aqueous media in a degassing apparatus (deaerator). In this way too, the energy efficiency of the overall process is improved further.

The first carbon dioxide separation apparatus 75 and the second carbon dioxide separation apparatus 90 interact in an advantageous manner especially when the first carbon dioxide separation apparatus is configured and operated such that at least 40%, preferably at least 50%, of the direct carbon dioxide emissions from the overall process are separated therein, and that the second carbon dioxide separation apparatus is configured and operated such that the overall degree of separation of the direct carbon dioxide emissions from the overall process is at least 89%. Studies show that a particularly energy-efficient process is obtained in this configuration. This exploits the fact that carbon dioxide in the PSA tail gas stream, especially after additional compression, has a higher partial pressure compared to the flue gas stream, for example 25 bara compared to 0.2 bara in the flue gas. This facilitates the separation of carbon dioxide. Further carbon dioxide can then be removed in a simple manner from the steam reforming flue gas by means of the second carbon dioxide separation apparatus.

In a further development of the last configuration discussed, the CO conversion plant comprises multiple stages that are operated at decreasing temperature in flow direction of the synthesis gas, i.e., for example, comprising a high-temperature (HTS), medium-temperature (MTS) or low-temperature (LTS) shift or conversion. In a further example, it is also possible for just two of the process stages mentioned to be included. In one example, the crude synthesis gas is cooled down to a temperature in the range from 180° C. to 220° C., before it is guided into an isothermal or cooled low-temperature shift (LTS) or medium-temperature shift (MTS) reactor which is designed as a heat exchange reactor in which the exothermic water-gas shift reaction (CO conversion) takes place and the converted synthesis gas is simultaneously cooled by a stream at suitable temperature, for example a hydrocarbon feed gas stream, boiler feed water, PSA tail gas, or a combination of such streams. The cooled converted synthesis gas then exits from the CO conversion plant at a temperature low enough to guide it directly as heating medium into the boiler of the regeneration section of the second carbon dioxide separation apparatus, which is configured as an amine scrub in one example. In one example, upstream of the inlet of the heating medium into the boiler of the regeneration section, it is additionally possible to provide a quench cooler in order to control the temperature at the boiler inlet such that the heating medium temperature does not exceed a particular threshold in order to prevent thermal breakdown of the amine solution used as absorbent.

The better utilization of heat in the integrated configurations leads to a lower ratio of steam consumption to steam production in the steam reforming plant. This simultaneously improves the overall degree of carbon dioxide separation if indirect emissions are also taken into account, which are dispensed with, for example, via the reduction in heating steam required. Also dispensed with are costly equipment items that have a high space demand for installation, for example air coolers.

The table which follows compares, for a steam reforming plant (SMR) with fixed hydrogen production, various cases of operation according to the invention (cases 5*d*, 5*e*, 5*f*) with operation without carbon dioxide separation (case 5*a*, prior art) or carbon dioxide separation solely from the steam reforming flue gas (case 5*b*, prior art).

Table Elucidations

CS: Carbon dioxide separation/carbon dioxide separation apparatus.

Cases 5*d*, 5*e*, 5*f*: First carbon dioxide separation plant as cryogenic carbon dioxide separation from the PSA tail gas; second carbon dioxide separation plant as amine scrub. Cases 5*e*, 5*f*: With LTS.

Parameter Definitions $CO_2$ separation level: Direct emissions only (%) (2):

Amount of $CO_2$ separated based on sum total of (amount of $CO_2$ separated+amount of $CO_2$ emitted):

$CO_2$ capture rate (on case x) [in %]=(CO2 captured (on case x))/(CO2 captured (on case x)+CO2 emitted (on case x))

$CO_2$ separation level: Direct+indirect emissions+steam credit (%) (9):

Amount of $CO_2$ separated based on sum total of (amount of $CO_2$ separated+indirect $CO_2$ emission for steam raising+indirect $CO_2$ emission for power generation+credit for steam as $CO_2$ equivalent).

Specific steam consumption (kg of steam/kg of $CO_2$ separated) (3):

Steam consumption from first+second CS based on amount of $CO_2$ separated: specific steam consumption [(kg steam)/(kg CO2 captured)]=(steam consumption of CC unit 1 (syngas)+steam consumption of CC unit 2 (flue gas))/(CO2 captured by CC unit 1+CO2 captured by CC unit 2)

Specific indirect emissions (kg of $CO_2$eq/kg of $CO_2$ separated):

Indirect emissions for first+second CS for steam raising and power generation as a CO2 equivalent, based on amount of $CO_2$ separated.

[75] first carbon dioxide separation apparatus (cryogenic carbon dioxide capture)
[76] conduit
[77] conduit
[78] conduit
[79] conduit
[72] [72] conduit
[80] hydrogen enrichment apparatus (PSA plant)
[81] conduit
[83] conduit
[90] second carbon dioxide separation apparatus
[91] conduit
[92] conduit
[504] conduit
[505] conduit
[506] conduit
[507] conduit
[509] conduit
[510] conduit
[511] conduit
[512] conduit

| | Case 5a: SMR without CS (FIG. 1) (comparison) | Case 5b: CS from flue gas only (FIG. 2) (comparison) | Case 5d: CS from PSA tail gas and flue gas, 90% CO2 separation (FIG. 4/5) (invention) | Case 5e: CS from PSA tail gas and flue gas, with LTS, 90% CO2 separation (FIG. 4/5) (invention) | Case 5e: CS from PSA tail gas and flue gas, with LTS, 74% CO2 separation (FIG. 4/5) (invention) |
|---|---|---|---|---|---|
| H2 production (m3 (STP)/h) | 100000 | 100000 | 100000 | 100000 | 100000 |
| Natural gas feed (kmol/h) | 1483 | 1483 | 1311 | 1255 | 1255 |
| Total natural gas (kmol/h) | 1876 | 1876 | 1710 | 1696 | 1696 |
| SMR steam export (kg/h) | 100286 | 100286 | 49902 | 49616 | 49616 |
| SMR power consumption (KW) | 2202 | 2202 | 1684 | 1580 | 1580 |
| Steam consumption (kg/h) of first CS | | 0 | 0 | 0 | 0 |
| Power consumption (KW) of first CS | | 0 | 13853 | 12985 | 12985 |
| Steam consumption (kg/h) of second CS | | 107561 | 46575 | 37126 | 30526 |
| Power consumption (KW) of second CS | | 9784 | 4237 | 3377 | 2777 |
| CO2 separation level: Direct emissions only (%) (2) | | 90.0% | 95.2% | 96.2% | 90.0% |
| CO2 separation level: direct + indirect em. + steam credit (%) (9) | | 83.6% | 86.8% | 90.4% | 86.4% |
| Spec. steam consumption (kg steam/kg CO2 separated) (3) | | 1.34 | 0.60 | 0.48 | 0.42 |
| Spec. indirect emissions (kg CO2 eq/kg CO2 separated | | 0.36 | 0.24 | 0.21 | 0.20 |
| Ratio of steam consumption to steam production (kg/kg) | | 1.07 | 0.93 | 0.75 | 0.62 |

LIST OF REFERENCE SYMBOLS

[10] hydrodesulfurization reactor
[11] conduit
[20] prereforming reactor
[21] [21] conduit
[30] main reforming stage
[31] conduit
[33] conduit
[40] first heat recovery apparatus
[41] [41] conduit
[50] CO conversion plant
[51] conduit
[60] second heat recovery apparatus
[61] conduit
[62] [62] conduit
[70] first carbon dioxide separation apparatus
[71] conduit
[72] conduit
[513] conduit
[514] conduit
[518] conduit
[519] conduit
[520] conduit
[521] conduit
[522] conduit
[523] conduit
[524] conduit
[551] compressor
[552] adsorption unit
[553] compressor
[554] multi-fluid heat exchanger
[555] condensate separator
[556] first membrane separation stage
[557] second membrane separation stage
[558] valve
[559] stripper column
[560] valve
[561] compressor (optional)

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for producing pure hydrogen by steam reforming of a feed gas containing hydrocarbons with reduced carbon dioxide emissions, comprising:

(a) providing a feed gas stream containing gaseous or evaporated hydrocarbons, (b) introducing the feed gas stream heated to a steam reforming inlet temperature into a main reforming stage, converting the feed gas stream in the main reforming stage under steam reforming conditions in a multitude of reformer tubes filled with a solid, particulate reforming catalyst to a crude synthesis gas stream containing hydrogen, carbon monoxide, carbon dioxide and unconverted hydrocarbons, wherein the reformer tubes are disposed in a reformer furnace, the interior of which is heated by means of a multitude of burners, with formation of a steam reforming flue gas stream, and wherein the steam reforming conditions comprise the addition of steam to the feed gas containing hydrocarbons and the establishment of a defined steam/carbon ratio, (c) discharging the crude synthesis gas stream from the main reforming stage and introducing the crude synthesis gas stream into a first heat recovery apparatus, cooling the crude synthesis gas stream in the first heat recovery apparatus in indirect heat exchange with a first coolant stream, discharging the cooled crude synthesis gas stream from the first heat recovery apparatus, (d) introducing the cooled crude synthesis gas stream into a carbon monoxide conversion plant comprising at least one carbon monoxide conversion stage, converting the cooled crude synthesis gas stream introduced into the carbon monoxide conversion plant under carbon monoxide conversion conditions to a converted synthesis gas stream, discharging the converted synthesis gas stream that has been enriched in hydrogen and carbon dioxide and depleted of carbon monoxide compared to the crude synthesis gas stream, (e) introducing the converted synthesis gas stream into a second heat recovery apparatus, cooling the converted synthesis gas stream in the second heat recovery apparatus in indirect heat exchange with a second coolant stream, discharging the cooled converted synthesis gas stream from the second heat recovery apparatus, (f) introducing the cooled converted synthesis gas stream into a hydrogen enrichment apparatus that works by the principle of pressure swing adsorption, discharging a pure hydrogen product stream and at least one pressure swing adsorptionPSA tail gas stream from the hydrogen enrichment apparatus, wherein the at least one pressure swing adsorption tail gas stream comprises carbon monoxide, carbon dioxide and unconverted hydrocarbons, (g) introducing at least a portion of the at least one pressure swing adsorption tail gas stream into a first carbon dioxide separation apparatus, configured as an apparatus for cryogenic carbon dioxide capture, and discharging the following streams from the first carbon dioxide separation apparatus:

(g1) a stream enriched in carbon dioxide compared to the pressure swing adsorption tail gas stream, which is discharged from the process as the first carbon dioxide-rich stream, (g2) a stream enriched in hydrogen compared to the pressure swing adsorption tail gas stream, which is recycled to process step (f), (g3) a cryogenic carbon dioxide captureCCC tail gas stream that has been depleted of carbon dioxide and hydrogen compared to the pressure swing adsorptionPSA tail gas stream and comprises carbon monoxide and unconverted hydrocarbons, (h) introducing at least a portion of the cryogenic carbon dioxide capture tail gas stream into at least one burner in the reformer furnace, burning the at least one portion of the at least one cryogenic carbon dioxide capture tail gas stream with combustion air and with a trim gas stream containing hydrocarbons, wherein the reformer tubes in the reformer furnace are heated and the steam reforming flue gas stream is formed, discharging the steam reforming flue gas stream from the reformer furnace, (i) introducing the steam reforming flue gas stream into a second carbon dioxide separation apparatus that works by means of a physical or chemical carbon dioxide separation process, discharging a carbon dioxide-depleted steam reforming flue gas stream from the second carbon dioxide separation apparatus, discharging a second carbon dioxide-rich stream.

2. The process according to claim 1, wherein the feed gas stream is pretreated by means of one or more processes selected from the following group:

desulfurization under desulfurization conditions and prereforming under prereforming conditions.

3. The process according to claim 1, wherein the first coolant stream guided to the first heat recovery apparatus comprises one or more fluid streams selected from the following group:

water and/or aqueous condensate, to produce a first steam stream, boiler feed water, to produce a preheated boiler feed water stream, feed gas containing hydrocarbons, to produce a preheated feed gas stream.

4. The process according to claim 1, wherein the second coolant stream guided to the second heat recovery apparatus comprises one or more fluid streams selected from the following group:

water and/or aqueous condensate, to produce a second steam stream, boiler feed water, to produce a preheated boiler feed water stream, feed gas containing hydrocarbons, to produce a preheated feed gas stream, pressure swing adsorption tail gas stream, to produce a preheated pressure swing adsorption tail gas stream, cryogenic carbon dioxide capture tail gas stream, to produce a preheated cryogenic carbon dioxide capture tail gas stream, and a carbon dioxide-laden absorbent stream.

5. The process according to claim 4, wherein the carbon monoxide conversion plant and the second heat recovery apparatus coincide in terms of construction and/or functionality.

6. The process according to claim 5, wherein the carbon monoxide conversion plant is configured as a cooled reactor, and the second coolant stream or one or more of the fluid streams comprised therein is/are used for reactor cooling.

7. The process according to claim 1, wherein the carbon monoxide conversion plant comprises:

(a) a two-stage configuration with a high-temperature carbon monoxide conversion stage and a low-temperature carbon monoxide conversion stage, between which is disposed a heat recovery apparatus, or (b) a one-stage configuration with a medium-temperature carbon monoxide conversion stage.

8. The process according to claim 7, wherein the molar proportion of carbon monoxide in the pressure swing adsorption tail gas is between 0 and 10 mol %.

9. The process according to claim, 1, wherein the apparatus for cryogenic carbon dioxide capture comprises:

at least one compression stage for compression of the pressure swing adsorption tail gas, p1 at least one membrane separation stage and/or adsorption stage for removal of the hydrogen-enriched stream, and p1 a stripping column in which carbon dioxide is obtained as the purified bottom product.

10. The process according to claim 1, wherein the column for cryogenic distillation of carbon dioxide comprises a column bottom that is heated by means of a boiler, wherein the heat source used in the boiler is neither heating steam nor a fluid stream which is supplied from the outside to the apparatus for cryogenic carbon dioxide capture.

11. The process according to claim 1, wherein the second carbon dioxide separation apparatus works by at least one carbon dioxide separation process selected from the following group:

(a) absorption with a carbon dioxide-selective chemical absorbent, (b) adsorption with a carbon dioxide-selective adsorbent, (c) membrane separation with a carbon dioxide-selective membrane, and (d) cryogenic carbon dioxide capture.

12. The process according to claim 1, wherein the first carbon dioxide separation apparatus is configured and operated such that at least 40% of the direct carbon dioxide emissions from the overall process are separated therein, and in that the second carbon dioxide separation apparatus is configured and operated such that the overall degree of separation of the direct carbon dioxide emissions from the overall process is at least 89%.

13. The process according to claim 1, wherein the second carbon dioxide separation apparatus is configured and operated such that the sum total of the vapour streams generated in the overall process is greater than the volume streams of the heating steam consumed for regeneration of the carbon dioxide separation apparatuses.

14. The process according to claim 1, wherein the specific steam consumption for regeneration of the carbon dioxide separation apparatuses per kg of carbon dioxide separated is less than 1.0 kg.

15. The process according to claim 1, wherein the first and second carbon dioxide-rich streams are sent to at least one common workup stage selected from the following group:

common carbon dioxide dryer, common carbon dioxide compressor, and common carbon dioxide liquefaction apparatus.

16. The process according to claim 1, wherein the process is operated in two operating periods at different times, wherein only the first carbon dioxide separation apparatus is operated in the first operating period, and the first carbon dioxide separation apparatus and the second carbon dioxide separation apparatus are operated in the second operating period.

17. A plant for producing pure hydrogen by steam reforming of a feed gas containing hydrocarbons with reduced carbon dioxide emissions, comprising the following mutually fluid-connected assemblies and components:

(a) a means of providing a feed gas stream containing gaseous or evaporated hydrocarbons, (b) a main reforming stage having a multitude of reformer tubes filled with a solid, particulate reforming catalyst, wherein the reformer tubes are disposed in a reformer furnace, the interior of which is heated by means of a multitude of burners, with formation of a steam reforming flue gas stream, a means of introducing the feed gas stream heated to a steam reforming inlet temperature into the main reforming stage, (c) a means of discharging a crude synthesis gas stream containing hydrogen, carbon monoxide, carbon dioxide and unconverted hydrocarbons from the main reforming stage, (d) a first heat recovery apparatus configured to cool the crude synthesis gas stream in indirect heat exchange with a first coolant stream, means of introducing the crude synthesis gas stream into the first heat recovery apparatus, a means of discharging a cooled crude synthesis gas stream from the first heat recovery apparatus, (e) a carbon monoxide conversion plant comprising at least one carbon monoxide conversion stage, a means of introducing the cooled crude synthesis gas stream into the carbon monoxide conversion plant, a means of discharging a converted synthesis gas stream which is enriched in hydrogen and carbon dioxide and depleted of carbon monoxide compared to the crude synthesis gas stream, (f) a second heat recovery apparatus configured to cool the converted synthesis gas stream with a second coolant stream, a means of introducing the converted synthesis gas stream into the second heat recovery apparatus, a means of discharging a cooled converted synthesis gas stream from the second heat recovery apparatus, (g) a hydrogen enrichment apparatus configured by the principle of pressure swing adsorption, a means of introducing the cooled converted synthesis gas stream into the hydrogen enrichment apparatus, a means of discharging a pure hydrogen product stream and at least one pressure swing adsorption tail gas stream from the hydrogen enrichment apparatus, wherein the at least one pressure swing adsorption tail gas stream comprises carbon monoxide, carbon dioxide and unconverted hydrocarbons, (h) a first carbon dioxide separation apparatus configured as an apparatus for cryogenic carbon dioxide capture, a means of introducing at least a portion of the at least one pressure swing adsorption tail gas stream into the first carbon dioxide separation apparatus, a means of discharging the following streams from the first carbon dioxide separation apparatus:

(h1) a stream enriched in carbon dioxide compared to the pressure swing adsorption tail gas stream, which is discharged from the process as the first carbon dioxide-rich stream, (h2) a stream enriched in hydrogen compared to the pressure swing adsorption tail gas stream, which is recycled to process step (f), (h3) a cryogenic carbon dioxide capture tail gas stream that has been depleted of carbon dioxide and hydrogen compared to the pressure swing adsorption tail gas stream and comprises carbon monoxide and unconverted hydrocarbons, (i) a means of introducing at least a portion of the cryogenic carbon dioxide capture tail gas stream and at least one trim gas stream into at least one burner in the reformer furnace, a means of discharging the steam reforming flue gas stream from the reformer furnace, (j) a second carbon dioxide separation apparatus configured to perform a physical or chemical carbon dioxide separation process, a means of introducing the steam reforming flue gas stream into the second carbon dioxide separation apparatus, a means of discharging a carbon dioxide-depleted steam reforming flue gas stream from the second carbon dioxide separation apparatus, a means of discharging a second carbon dioxide-rich stream.

18. The plant according to claim 17, wherein the apparatus for cryogenic carbon dioxide capture comprises:

at least one compression stage for compression of the pressure swing adsorption tail gas, at least one membrane separation stage and/or adsorption stage for removal of the hydrogen-enriched stream, a stripping column in which carbon dioxide is obtained as the purified bottom product, wherein the plant further comprises:

a second carbon dioxide separation apparatus which is operable as a continuous amine scrub and comprises an absorption section and a regeneration section.

19. A process for retrofitting an existing plant for production of pure hydrogen by steam reforming for reduction of carbon dioxide emissions, wherein the retrofitting is effected in two development stages at different times, wherein only the first carbon dioxide separation apparatus is installed in the first development stage and the second carbon dioxide separation apparatus is additionally installed in the second development stage.

* * * * *